US011394544B2

(12) United States Patent
Rastit

(10) Patent No.: US 11,394,544 B2
(45) Date of Patent: Jul. 19, 2022

(54) VALIDATION OF BLOCKCHAIN ACTIVITIES BASED ON PROOF OF HARDWARE

(71) Applicant: AITIVITY INC., Marseilles (FR)

(72) Inventor: Jérôme Rastit, Marseilles (FR)

(73) Assignee: AITIVITY INC., San Francisco, CA (US)

( * ) Notice: Subject to any disclaimer, the term of this patent is extended or adjusted under 35 U.S.C. 154(b) by 331 days.

(21) Appl. No.: 16/241,468

(22) Filed: Jan. 7, 2019

(65) Prior Publication Data

US 2020/0220723 A1 Jul. 9, 2020

(51) Int. Cl.
*H04L 9/08* (2006.01)
*H04L 9/06* (2006.01)
*H04L 9/30* (2006.01)

(52) U.S. Cl.
CPC .......... *H04L 9/0897* (2013.01); *H04L 9/0618* (2013.01); *H04L 9/30* (2013.01); *H04L 2209/38* (2013.01)

(58) Field of Classification Search
CPC ....... H04L 9/0897; H04L 9/0618; H04L 9/30; H04L 2209/38; H04L 9/3247; H04L 9/3239
See application file for complete search history.

(56) References Cited

U.S. PATENT DOCUMENTS

| | | | | |
|---|---|---|---|---|
| 10,116,454 B2* | 10/2018 | Haga | ................. | G06F 21/33 |
| 10,320,843 B1* | 6/2019 | Dobrek | ................. | H04L 9/3239 |
| 10,461,940 B2* | 10/2019 | Cheng | ................. | G06F 21/64 |
| 10,673,626 B2* | 6/2020 | Sandberg-Maitland | ................. | H04L 9/0822 |
| 10,715,531 B2* | 7/2020 | Thekadath | ............ | H04L 63/123 |
| 10,887,100 B2* | 1/2021 | Wentz | ................. | H04L 63/0807 |
| 11,018,852 B2* | 5/2021 | Chee | ................. | H04L 9/3265 |
| 2016/0275461 A1* | 9/2016 | Sprague | ................. | H04L 63/126 |
| 2018/0198620 A1* | 7/2018 | Pearson | ................. | G09C 1/00 |
| 2018/0225661 A1* | 8/2018 | Russinovich | ................. | G06Q 20/00 |
| 2018/0254898 A1* | 9/2018 | Sprague | ................. | H04L 9/3271 |
| 2019/0305938 A1* | 10/2019 | Sandberg-Maitland | ................. | H04L 9/321 |
| 2020/0167319 A1* | 5/2020 | Fritz | ................. | H04L 41/0806 |
| 2020/0167779 A1* | 5/2020 | Carver | ................. | G06Q 20/401 |
| 2020/0175179 A1* | 6/2020 | Iyer | ................. | H04L 9/0618 |
| 2020/0195497 A1* | 6/2020 | Obaidi | ................. | H04L 41/0806 |

(Continued)

OTHER PUBLICATIONS

Hardjono et al. (Cloud-Based Commissioning of Constrained Devices using Permissioned Blockchains, Proceedings of ACM IoT Privacy, Trust & Security, 2016, 8 pages) (Year: 2016).*

*Primary Examiner* — Oleg Korsak
(74) *Attorney, Agent, or Firm* — Buchanan Ingersoll & Rooney PC

(57) ABSTRACT

The validation of blocks in a blockchain is based upon "proof of hardware." Rather than dividing the power to make a validation decision among computational abilities, accumulation of a commodity, or the like, proof of hardware divides the power of the decision among the devices that are involved in the validation process. Basically, each device involved in the process includes a hardware security module having a private key and an associated public key. The device is identified by its public key, and is able to sign new blocks. The device can sign a block, which it shares with the community, to be added as a new block in the chain, and is able to validate blocks signed by other devices in the community.

8 Claims, 4 Drawing Sheets

(56) References Cited

U.S. PATENT DOCUMENTS

| | | | |
|---|---|---|---|
| 2020/0204400 A1* | 6/2020 | Skertic | F02C 7/26 |
| 2020/0204463 A1* | 6/2020 | Guan | H04L 67/20 |
| 2020/0210978 A1* | 7/2020 | Brown | H04L 9/0637 |
| 2020/0213215 A1* | 7/2020 | Jayadevappa | H04L 63/0876 |
| 2020/0287878 A1* | 9/2020 | Allen | H04L 9/0825 |
| 2020/0351098 A1* | 11/2020 | Wentz | H04L 9/3218 |
| 2021/0160058 A1* | 5/2021 | Zhang | H04L 9/0637 |

\* cited by examiner

VALIDATION OF BLOCKCHAIN ACTIVITIES BASED ON PROOF OF HARDWARE

BACKGROUND

The present disclosure pertains to blockchain technology, and more particularly to a technique for adding a block to a chain, which does not require proof of work.

Blockchain technology relies upon distributed trustless consensus to validate a series of blocks contained in a chain of the blocks, i.e. a blockchain. The distributed trustless consensus is implemented by an algorithm that enables the users of the blockchain to validate the sequence of blocks that constitute the chain. The most commonly used algorithm for this purpose is known as proof of work. Proof of work is a requirement that expensive computations, also known as "mining," be performed in order to add new blocks on the blockchain. The use of complex challenges helps to preserve the division of work that is required to validate the chain, with the objective that no one entity can achieve 51% of the required work and essentially take control of the blockchain.

The disadvantage of using proof of work as the validation algorithm for a blockchain is that it requires a significant amount of computational power. For example, many thousands of computers may be required to validate the calculations for a chain of any significant length as the difficulty increases. As the popularity of blockchain transactions continues to grow, the energy consumption associated with this technology has become significant. For example, it is estimated that Bitcoin's electricity consumption as a percentage of the world's electricity consumption is as much as 0.33%. One study has projected that, if Bitcoin adoption continues at its expected rate, such usage alone could produce enough $CO_2$ emissions to push global warming above 2° C. in less than three decades (Mora et al., *Nature Climate Change* 8, 931-933, October 2018).

It is desirable, therefore, to provide a different technique for adding blocks to a blockchain, which does not rely upon proof of work. Other types of solutions, such as proof of space and proof of stack, have been designed with this goal in mind. To date, however, they have not been widely accepted.

SUMMARY

The validation concept described in this disclosure is termed "proof of hardware." Rather than dividing the power to make a validation decision among computational abilities (proof of work), accumulation of a commodity (proof of stake), or the like, proof of hardware divides the power of the decision among the devices that are involved in the validation process. Basically, each device involved in the process is identified by its public key, and is able to sign new blocks. The device can sign a block, which it shares with the community, to be added as a new block in the chain, and is able to validate blocks signed by other devices in the community.

One issue that is involved in this approach is that virtual devices can be easily created. Consequently, if an entity is able to create a sufficient number of virtual devices that constitute at least 51% of the total community, it could take control of the blockchain.

To address this issue in the context of the present disclosure, each device that constitutes a member of the community participating in the validation of a block is required to have a unique hardware security module (HSM). An HSM is a physical computing device that safeguards and manages digital keys for strong authentication. Due to the intrinsic nature of an HSM, the private key cannot be extracted from the physical module itself, and is not known to any outside entity. As such, the functionality of the HSM is not easily spoofed. Each device that participates within the blockchain community has a unique private key that is established when the module is built, and is not accessible by any means outside of the device in which it is incorporated. The public key of the module is registered within the blockchain community by a trusted entity that builds and/or provides devices containing HSMs to the participants in the community. Devices that are active and sign new blocks for a blockchain can be rewarded in the same manner as blockchains that employ proof of work, proof of stake or other types of validating algorithms.

Furthermore, devices equipped with an HSM can be used to sign information from sensors associated with the devices, to certify that the data from the sensor has not been modified and can be used as proof.

DETAILED DESCRIPTION

Figure 1:
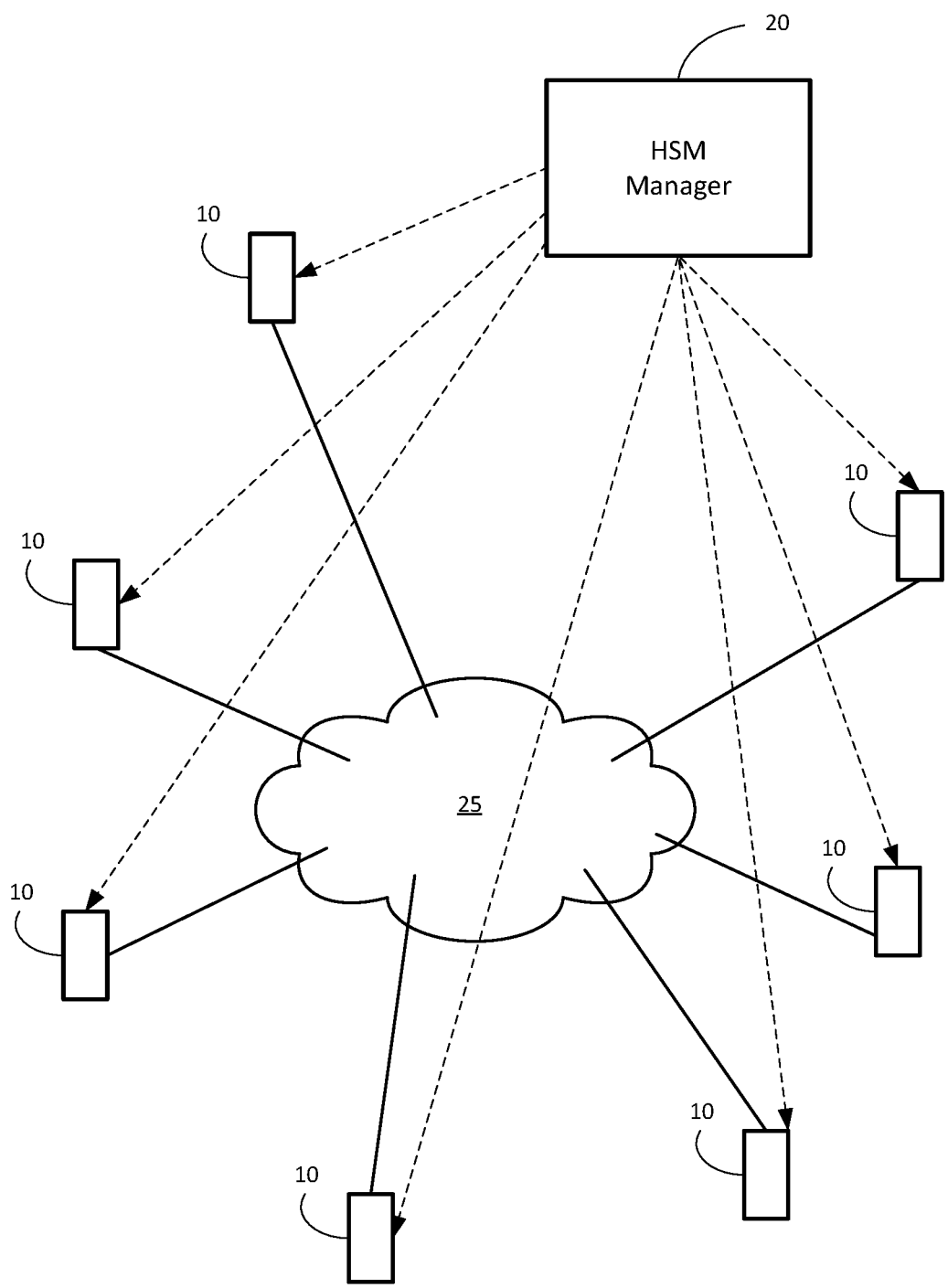
FIG. 1 is pictorial view of a system for conducting blockchain transactions in accordance with an embodiment of the disclosure.

FIG. 1 illustrates a community of devices 10 that interact with one another to validate blocks in a blockchain. Each device has an associated asymmetric key pair, comprising a private key and a public key, which are unique to that device. Each device is identified by its public key, and uses its private key to sign a block added to the chain. A new block initiated by a device is shared with the community of devices that add it to the blockchain, and the device is able to validate blocks initiated by other devices. The power to add a block is equally divided among the various devices. In other words, each device has an equal vote in the validation decision, regardless of its computing power or the value of any stake it may own.

As noted previously, an issue to be addressed in the context of blockchain transactions is the ability of an entity to control the addition of new blocks if it owns, or otherwise controls, at least 51% of the devices that are participating in the blockchain. In a system of the type depicted in FIG. 1, where the decision power is divided among the participating devices, the possibility exists that a given entity could generate a large number of virtual devices, sufficient to constitute at least 51% of the total number of devices participating in a transaction. In such a case, the entity would have the ability to influence the transaction.

To avoid such a possibility, in accordance with an embodiment of the disclosure, each device that participates in the addition or validation of a block is required to have an HSM that stores and manages its private key. An HSM is a physical computing device that safeguards and manages digital keys for strong authentication, and provides cryptoprocessing. The private key is generated at the time that the HSM is created or activated, and stored in the module in a manner that prevents it from being extracted without destroying the module. Consequently, the private key is not known by any individual, even the owner of the HSM.

To ensure integrity, each of the HSMs of the devices that participate in adding new blocks are certified by an independent trust entity 20, e.g., an HSM Manager. The HSM Manager can be the company that manufactures the HSMs, or a separate entity that certifies the modules after they have been manufactured with their embedded keys. Thus, in addition to storing its unique private/public key pair, each HSM that participates in adding new blocks to a blockchain has a certificate issued by the HSM Manager 20 that confirms its authenticity. The public key of each HSM is securely shared in the network by the HSM Manager. For instance, the HSM Manager can distribute a list containing the public keys of the certified nodes. As another example, the public keys of certified nodes can be added in a block of the chain that is signed and/or certified by the HSM Manager.

An HSM Manager can provide additional information about an HSM node besides its public key in the blockchain to certify its identity, for example a company name or reference. In this case, all the transactions added in the blockchain by this HSM node whose identity has been certified can be traced and used as proof that they originate from the node. For devices to confirm an HSM Manager's authority, each public key of the HSM Manager is also securely shared in the network, and is registered into the blockchain by the entities that manufacture and/or sell the devices 10 that contain the HSMs.

In the illustrated example, a single HSM Manager 20 authenticates the HSMs of the devices 10 within the community that participate in a transaction. In an alternative embodiment, multiple HSM Managers can collectively participate in the authentication of the HSMs that are employed in a transaction. For example, a current HSM Manager can add a new HSM Manager by adding its public key in a block that is signed or certified by the current HSM Manager. In such a case, one group of HSMs may be authenticated by a first HSM Manager, and a second group of HSMs would be authenticated by a second HSM Manager. As long as both of the HSM Managers are recognized as sanctioned trust entities for adding new blocks to a blockchain, the validation procedure can be successfully performed.

Figure 2:
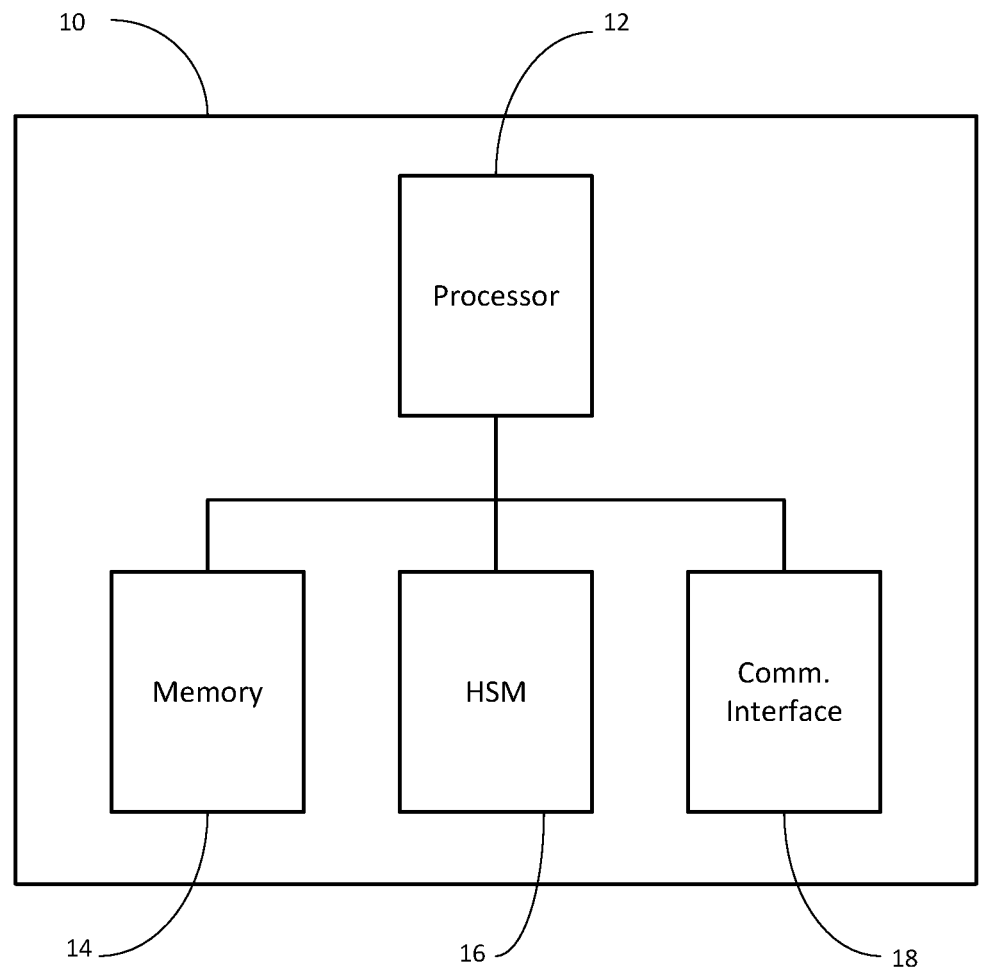
FIG. 2 is a block diagram of the components of a blockchain network node.

Each device 10 functions as a node in the blockchain community. With reference to FIG. 2, each HSM-equipped device includes a processor 12, a memory 14 for storage, an HSM 16 for signing transactions, and a communication interface 18 for connection to and communication over a network. The communication interface can be wireless, wired, e.g., Ethernet, or a combination of both. Such a device can be implemented in a personal computer, a server, a smartphone or any other such structure that has the appropriate processing capabilities and includes, or can otherwise be associated with, an HSM.

In an alternative implementation, the processor and memory can be located within the HSM as well, so that the entire computing operation is more secure.

In order to initiate or validate the addition of a block to a chain, a node must be powered up, and have access to a network 25 via which it communicates with all of the other nodes. Each node stores in its memory a list of all of the other nodes in the blockchain, e.g., a collection of each of their public keys, and other components of block history that may be required to validate transactions and previous blocks. In the basic process for adding a new block, each time any node conducts a transaction, it sends the transaction to an HSM-equipped node (hereinafter "HSM node") that is designated for addition of a new block. The particular node can be designated according to an established protocol or algorithm. For instance, the designated node could be the next one to appear in the node list following the node that added the last block to the chain. To avoid impeding the addition of a new block, if the designated node is not currently available, e.g., because it is shut down, has a network outage or a system/process error, the next successive HSM node in the list that is available can function as a backup for the designated node, and collect the transactions as they are generated so it can generate the new block with all the latest transactions.

In this regard, a number of different categories of nodes can exist on the blockchain network. One category of nodes is the HSM Manager(s) 20, which maintain information regarding the public key of all nodes participating in the blockchain, and can thereby determine which nodes are valid. A second category of nodes are HSM nodes that are able to add new blocks and transactions, and remain active in the network, e.g., they stay online in order to function as designated nodes to add new blocks. A third category of nodes is HSM nodes that may only be active when they are adding a new transaction to a block being formed. Because they may not stay online for large periods of time, they are not suited to function as designated nodes for forming a new block. A fourth category of nodes is devices that are not equipped with HSMs, but still have an associated public/private key pair. These nodes have the ability to add transactions in a conventional manner, but are not able to add new blocks and do not participate in the validation of transactions.

The designated HSM node (or its backup) assembles the received transactions into a block to be added as a new block in the blockchain, and signs the new block with its private key. The assembled transactions may all pertain to a single activity, e.g., the transfer of a coin from one party to another, or to multiple different activities. The new block with the assembled transactions is then broadcast to all of the other nodes in the blockchain community. Each of the other HSM nodes checks the validity of all of the transactions in the new block, such as checking whether a coin being transferred has already been spent. The nodes accept the new block only if all of the transactions are determined to be valid. The nodes indicate their acceptance of the block by working to create the next block in the chain, using a hash of the accepted block as the previous hash of the blockchain.

Although not discussed in detail herein, other functionalities associated with blockchain can also be performed as part of adding a block to the chain, such as signing individual transactions, calculating a hash of the content of the block, etc.

The HSM Manager is responsible for adding nodes, i.e., public keys, to the blockchain. For this purpose, the HSM Manager includes a server for keeping track of the authenticated HSM nodes in each blockchain, and communicating with the nodes, e.g., via the network 25. By receiving authentication from the HSM Manager, a new node becomes trusted and can be added to the chain. For example, a list of all trusted nodes can be updated with the identity, e.g., public key, of a newly-certified HSM node. When the node list is modified, the HSM Manager transmits it in an automatic and secure manner to all of the nodes in the list (as indicated by the dashed arrows in FIG. 1). As an alternative to publishing a list with the public key of each node in the community, the collection of public keys can be added to the blockchain, e.g., in a new block created and signed (or otherwise certified) by the HSM Manager.

The HSM Manager can remove an HSM node that has been compromised or does not comply with the rules of the blockchain. For example, a node can be revoked, and the HSM Manager can indicate this fact by including a date and time of revocation of the node in the node list. In this situation, all blocks signed by the node after the date of revocation are considered to be invalid.

Figure 3:
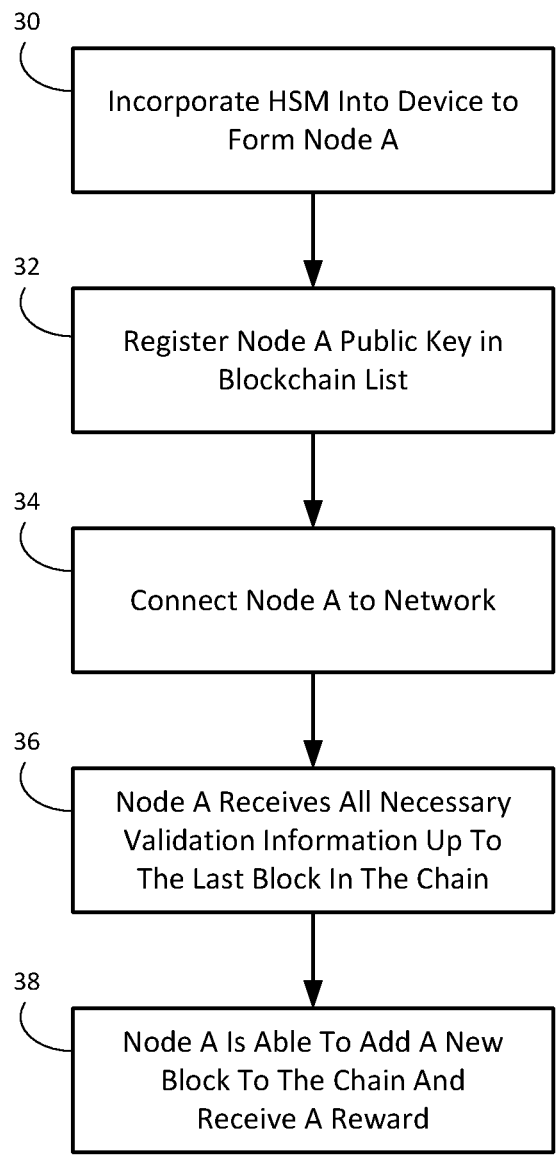
FIG. 3 is a flowchart illustrating the introduction of a node into a blockchain community.

FIG. 3 is a flowchart of an exemplary procedure for introducing an HSM node into a blockchain and using it to add a new block. At step 30, the HSM Manager builds a device containing a processor, storage and an HSM. Alternatively, the basic structure of the device, including the processor and the memory, may be manufactured by a third party and then provided to the HSM Manager to be fitted with an HSM. In the illustrated example, the device is designated as "Node A."

In step 32, the HSM Manager registers the public key of Node A, designated as "Key A," in the node list. A user purchases Node A, and then connects it to the Internet, or other suitable network, at step 34. At this point, Node A is fully functional and awaits a transaction to validate. At step 36, Node A receives all information necessary for the node to validate information up to the last block in the chain, e.g., all of the transactions in each block and the hash of each block. Thereafter, at step 38, the node is able to add a new block to the chain, as described previously, and receive a reward for doing so, e.g., one coin.

As noted previously, an HSM node that is on the node list can add transaction information to a block being constructed. Such a node might include, or otherwise be associated with, a sensor, and has the ability to add transactions to the blockchain that certify dated values obtained from its sensor (e.g., sound record, photo, video, measurement, etc.). The values can be validated by the HSM, to prove that the data has not been modified or altered, and corresponds to the value recorded at the indicated time. This validation is normally done in a blockchain by adding a hash of the file containing the data, and signed by a node's the private key that can be verified by its public key. In the context of the present disclosure, such a procedure is not necessary because the HSM is already registered and can have a certified identity as part of the blockchain.

As an example a camera that takes a picture can have an HSM which certifies that the picture originates from the sensor (camera) and has not been altered. It can be used by a journalist to certify that the photo has not been altered or modified, and that it corresponds to reality. For each photo taken, a hash of the photo, signed by the HSM inside the camera, is added to the blockchain and can be used as proof. The integrity of the HSM will validate that the picture has not been altered and the blockchain time of addition validates the date it has been taken.

Figure 4:
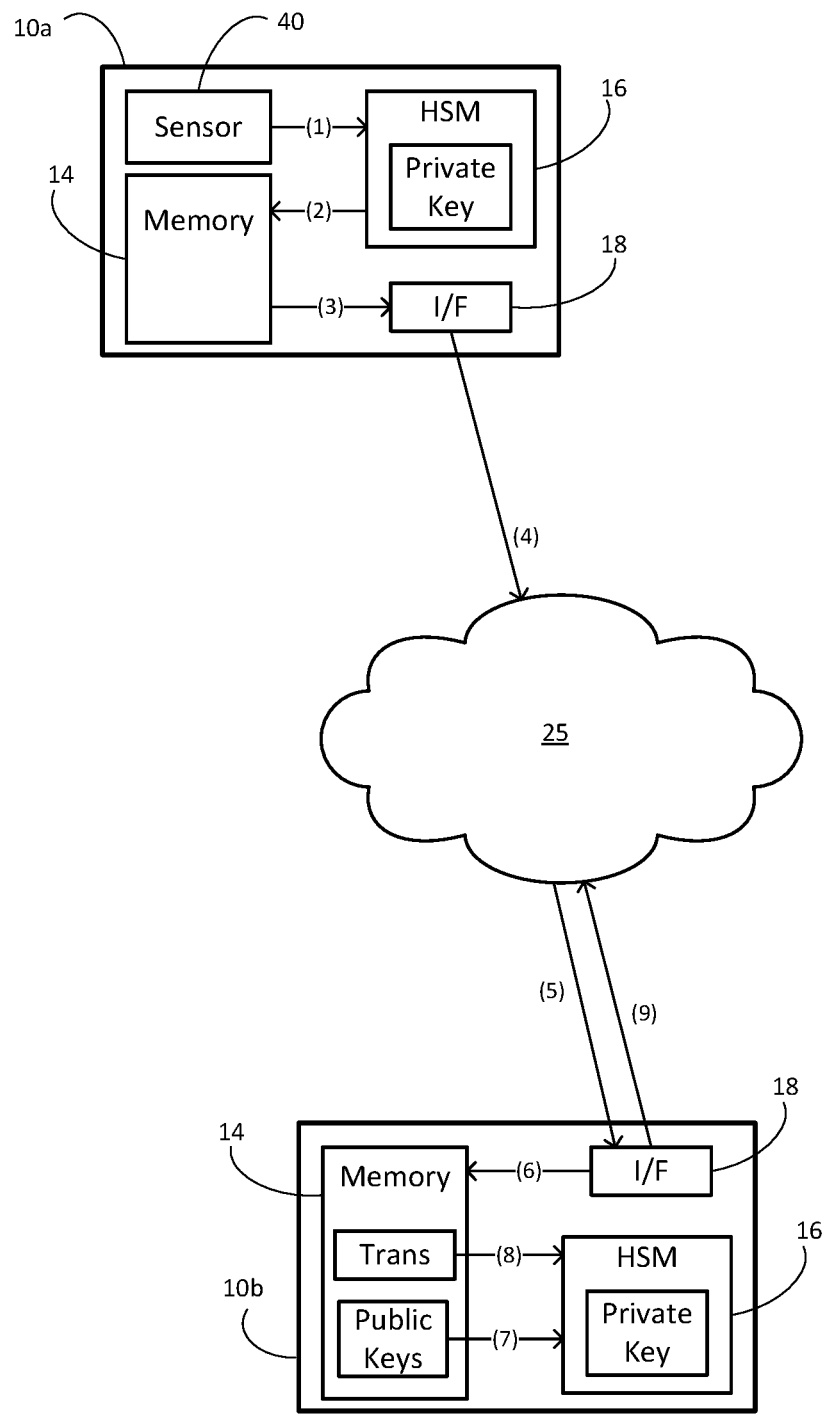
FIG. 4 is a pictorial diagram of the addition of a sensor transaction to a blockchain.

An example of such an operation is depicted in the diagram of FIG. 4. With reference thereto, an HSM node 10*a* contains a sensor 40 that produces data. This data is provided to the HSM 16 (step 1), where it is signed with the private key within the HSM, and stored in the memory 14 of the node (step 2). For example, a hash value of the forwarded data can be computed, and that hash of the data can be signed. If multiple sets of data are being generated, the signed hash can be stacked with other signed data sets in the memory. At a suitable time, the stacked data values are sent to a designated HSM node 10*b* via the communication interface 18 of the node 10*a* and the network 25, to be added as a transaction to the next block in the block chain (steps 3, 4 and 5).

The HSM node 10*b* receives the transaction via its communication interface 18, and stacks it in its memory 14 with all other transactions that need to be added in the next block (step 6). It can retrieve the public key associated with HSM node 10*a* from its memory (step 7) to check the validity of the received transaction. Once all stacked transactions have been validated, the HSM of the node 10*b* signs the content of the new block with its private key (step 8), and sends the new block to the network (step 9) to complete the blockchain.

Proof of hardware can reuse part of the algorithm developed for other types of proof, for example using only the longest chain to choose which chain is valid. For instance, if a node and its backup have created a block at the same time, the block created by the original node will be used for the final block of the chain, and the block created by the backup (next node) will be disregarded.

Using proof of hardware as the mechanism for validating blockchain transactions offers several advantages over proof of work and proof of stack. One such advantage is that, in proof of hardware, each node can only be added to the blockchain by an HSM Manager. As such, each node is associated with a trusted entity, and thus is a certified node. In contrast, in proof of work and proof of stack, any device can become a node, without certification.

As another advantage, with proof of hardware any node can generate a new block as a result of being active in the blockchain. On other hand, to generate a new block under proof of work, a node must perform a large amount of work, and under proof of stack, the node can only generate a block if it owns cryptocurrency.

In proof of hardware, a node can be banned by an HSM Manager if it exhibits bad behavior or becomes compromised. In proof of work, nodes cannot be banned from the blockchain in an efficient way because using a new node doesn't provide any disadvantage.

With respect to security, in proof of work a party can hack the blockchain if it is able to monopolize 51% of the work being performed on the blockchain, and in proof of stack, hacking is possible if a party owns 51% of the cryptocurrency associated with the blockchain. On the other hand, under proof of hardware, hacking is only possible if a party controls 51% of all of the physical devices participating in the blockchain. From a practical standpoint, accumulating such a number of hardware devices is a much more difficult position to achieve.

From the foregoing, therefore, it can be seen that using proof of hardware as the mechanism for validating blocks added to a chain is not only more energy-efficient than proof of work, but also provides a greater deal of trustworthiness and security than other known techniques, since the validation process is equally divided among all of the certified devices participating in the blockchain.

While the preceding discussion of blockchain transactions was presented with exemplary references to an exchange of cryptocurrency and recording sensor data, it will be appreciated that the practical applications of the proof of hardware model for validating transactions is not limited to such. Rather, it is well-suited for other types of blockchain transactions, such as smart contracts and other forms of legal and business documentation, medical records, digital identification, data backup, and the like. The exemplary embodiments described herein should not be interpreted as limiting the practical scope of the appended claims in any way.

What is claimed is:

1. A system for conducting blockchain transactions, comprising:
   a hardware security module manager; and
   a plurality of nodes that constitute a blockchain community, at least some of said nodes including:
   a communication interface for communicating with the other nodes in the blockchain network; and
   a hardware security module (HSM) that is certified by the hardware security module manager, and includes:
   a memory for storing a private key that is unique to the node, a public key associated with the private key, and information pertaining to public keys associated with other nodes in the blockchain network whose HSMs have been certified by the hardware security module manager; and
   a processor;
   wherein the hardware security module manager is configured to:
   store a set of the public keys of each of the nodes whose HSM has been certified by the hardware security module manager,
   distribute the set of the public keys to the nodes in the blockchain community, to indicate the authorization of the nodes to participate in blockchain activities, and
   add or remove a node to/from the blockchain by adding or removing the public key of the node to/from the set of keys distributed among the blockchain community.

2. The system of claim 1, wherein the set of public keys is contained in a list that is distributed by the hardware security module manager to the nodes in the blockchain community.

3. The system of claim 1, wherein the set of public keys is embedded in a block signed by the hardware security module manager.

4. The system of claim 1, wherein the hardware security module manager has an associated private key and public key, and its public key is included in the set of keys that is distributed to the nodes in the blockchain community.

5. The system of claim 4, wherein the hardware security module manager is configured to add a new hardware security module manager to the blockchain community by including the public key of the new hardware security module manager in the set of keys that is distributed to the nodes in the blockchain community.

6. The system of claim 1, wherein, in addition to the public key of a node that is distributed to other nodes in the blockchain community, the hardware security module manager adds certified identifying information for the node to a blockchain, to enable transactions added to the blockchain by that node to be traced and validated.

7. The system of claim 1, wherein at least one of the nodes comprises a sensor, and wherein data generated by the sensor is provided to the node's hardware security module to be signed with the private key of the hardware security module and added to a blockchain, to thereby certify the integrity of the data as of the time it is added to the blockchain.

8. The system of claim 1, wherein the processor of the HSM is configured to: generate a new block for the blockchain by signing a block containing one or more new transactions with the private key stored in the memory of the HSM, and transmit the signed block to the other nodes in the blockchain network via the communication interface, and receive a block generated by another node in the blockchain network, accept the received block by validating all transactions contained in the received block, and confirm that the received block has been signed by the other node, using the stored information about the public key associated with the other node.

* * * * *